Jan. 19, 1932. D. RASO Re. 18,339

AUTOMATIC GAS IGNITER

Original Filed Aug. 6, 1928

INVENTOR.
Dante Raso
BY
M. F. Woolard
ATTORNEY.

Reissued Jan. 19, 1932

Re. 18,339

UNITED STATES PATENT OFFICE

DANTE RASO, OF BROOKLYN, NEW YORK, ASSIGNOR, BY DIRECT AND MESNE ASSIGNMENTS, TO MAXIMILLIAN P. JANISCH, OF MILWAUKEE, WISCONSIN

AUTOMATIC GAS IGNITER

Original No. 1,724,221, dated August 13, 1929. Serial No. 297,608, filed August 6, 1928. Application for reissue filed April 25, 1931. Serial No. 532,969.

My invention relates to automatic gas igniters and more particularly to an igniter adapted to ignite said burner initially and to re-ignite said burner automatically should the flame be extinguished for any cause.

The flame of a gas burner, such as the burner of a gas range commonly used for domestic cooking, is frequently extinguished by water which boils over, by drafts, etc. The attendant is often unaware that the flame has been put out, or he or she may be absent from the room or house at the time, so that the burner is not immediately re-ignited. In such event, the gas escapes into the room and the atmosphere becomes contaminated with a poisonous and explosive gas whereby the lives of persons in the room or elsewhere in the house, and particularly of sleeping persons, are endangered.

It is an object of the present invention to provide an automatic igniter which will automatically re-ignite a burner should the flame of the latter be accidentally extinguished, the igniter serving also to ignite the burner initially upon operation of the usual hand valve.

It is a further object of the present invention to provide an automatic igniter which can be readily attached to burners now in use, which is simple and sturdy in construction, is inexpensive to manufacture, and is positive and reliable in operation.

A further and important object of my invention is to provide a construction in which the re-lighting pilot although operatively associated with the burner, is wholly free from any attachment thereto, so that the burner may be removed from its arrangement in the gas range without the necessity for disconnecting any attached parts. Such construction permits the quick dissociation of the burner from the range, to permit periodic cleaning and renovating of the burner, as is required to maintain the highest efficiency of the latter. This very desirable result is achieved by arranging the re-lighting pilot in such juxtaposition with relation to the burner, that one is relatively movable with respect to the other, whereby separation of the two elements may be instantly effected, and this without the disconnection of any means for uniting them in fixed relation.

Other objects will appear from the following description and the features of novelty will be pointed out in the appended claims.

In the drawings which show, by way of example, a preferred form of my invention without defining its limits, Figure 1 is a side elevation of a burner with my automatic igniter in position thereon;

Figure 1:
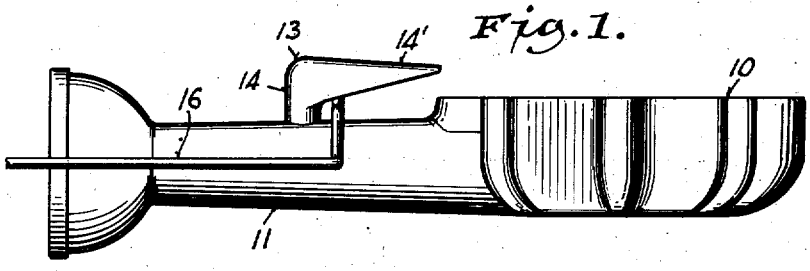

Referring to the drawings, 10 indicates a burner of any usual or known construction having a feed-pipe 11 connected thereto and controlled by any suitable valve (not shown). The gas flowing through the pipe 11 escapes through and burns at the openings 12 in the burner in the well-known manner.

My novel automatic igniter is composed of a member 13 in the form of an elbow having a tubular vertical section 14 which passes through the wall of the pipe 11 and projects into the interior thereof. The section 14 terminates at its lower end along a plane which is inclined to the vertical and is thereby provided with an enlarged inlet in the path of the gas flowing through the pipe 11. The horizontal section 14′ of the member 13 is formed of a tubular portion whose lower half has been cut away along a plane at an angle to the axis of such section thereby providing a curved hood or shield which is elevated relatively to the burner 10. The upper portion of the vertical section 14 is completely closed except for an approximately horizontal opening 15. The member 13 may be connected to the pipe 11 in any desired way, as by drilling a hole in said pipe and tapping the same so as to cooperate with an external thread on the section 14, or by welding the parts together, etc.

A pilot tube 16, which is connected to the gas supply line in advance of the valve controlling the pipe 11, is operatively associated with the member 13 and terminates at a point adjacent and slightly below the opening 15. Where a number of burners are employed, each of them will have a separate pilot tube and all of the latter may be controlled by a single needle or other valve to regulate the quantity of gas flowing through the tubes.

The operation of my automatic igniter is as follows: The gas escaping from the pilot tube 16 burns continuously in front of the opening 15, as this tube is not controlled by the valve in the pipe 11. Upon opening of the valve in said pipe 11, the gas will flow to the burner 10 and at the same time a column of gas will rise in the vertical section 14 of the member 13 and escape in a fine jet through the opening 15 and toward the burner 10. This jet of gas will pass directly over the pilot light at the end of the tube 16 and will be ignited thereby and will in turn ignite the gas issuing from the openings 12 in the burner 10. Now should the flame of the burner 10 be extinguished by water boiling over from the vessel being heated, or by draft or for any other reason, the burner will be immediately re-ignited by the jet of flame issuing from the opening 15. The pilot light is protected against water and drafts by the curved hood or shield 14′, so that so long as the gas is flowing to the burner 10, a jet of flame will issue from under the hood 14′ and strike the burner 10.

The specifications prescribed by the American Gas Association, and other like associations, forbid the fixed attachment to the burners of gas ranges of any part which has to be uncoupled or disconnected, or which would otherwise interfere with the free and unimpeded removal of the burner by merely lifting it away from its operative position in the range. One object of my invention is the production of a construction which will meet the requirements of the specifications referred to. As a result of study of the problem involved, I have produced a construction which is in full compliance with the requirements of the said specifications, and which will permit relative movement between the gas burner and the associated but wholly disconnected re-lighting pilot, so that the burner may be easily dissociated from the pilot and removed from the range without encountering or disturbing any fixed connection.

Figure 2:
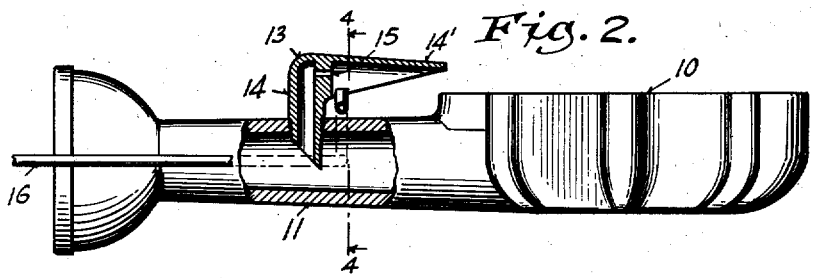
Figure 2 is a similar view, partly in section.
Figure 3:
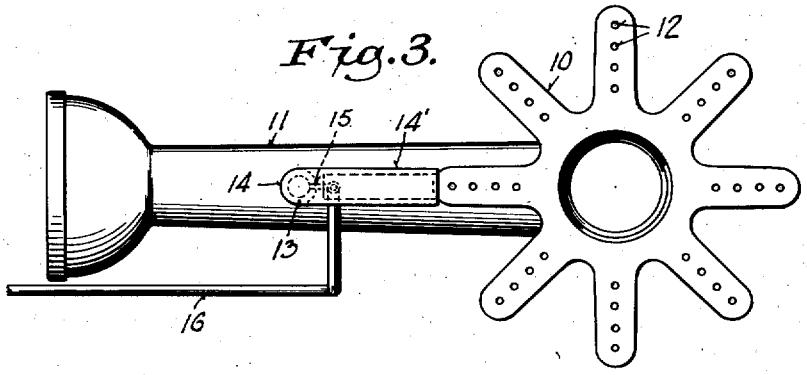
Figure 3 is a plan view of the same.

The course of the pilot tube 16 is indicated in Figs. 1, 2 and 3, in which the free end of the pilot tube is shown as slightly upturned, so that the re-lighting jet maintained at such free end, will always cross the path of the jet of gas flowing through the opening 15. The pilot tube 16 normally maintains the position in which it is shown, with the upturned free end of the said tube positioned as described. Operative association of the parts is secured by giving a lateral movement to the burner 10 and feed pipe 11, so as to pass the said upturned end of the pilot tube into the space between the feed pipe 11 and the transversely curved hood 14′. Thereupon, the burner 10 becomes correctly positioned in the range by properly located indexing devices. Each of the parts, that is the pilot tube 16 and the burner 10, maintain their independence, and no actual connection between the parts is established.

Dissociation of the burner from the pilot tube, is readily effected by lifting the burner out from the indexing devices, and giving the same a slight reverse lateral movement, to swing the hood 14′ away from the free end of the pilot tube. The main burner 10 is always loose.

Figure 4:
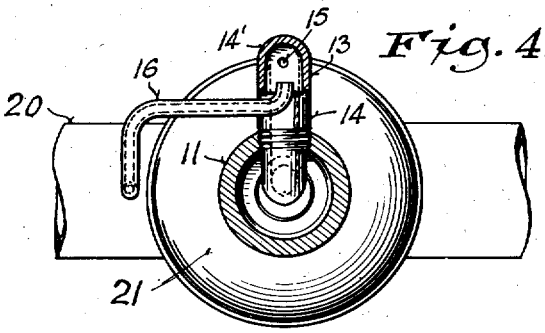
Figure 4 is an enlarged, vertical, sectional view, transversely of the feed pipe, on the line 4—4, Fig. 2, showing in greater detail, the association of the re-lighting pilot and the burner, and the two parts as operatively positioned in a movable relation with respect to each other, to permit their separation without disconnection of any fixed uniting devices.

In the background of Fig. 4, the manifold 20 is shown, as well as the bell or mixing chamber 21 of the feed or gas intake pipe 11, both the gas intake pipe 11 and the pilot tube 16 being supplied with gas from the manifold, through proper connections therewith. The clearance between the upper part of the gas intake pipe 11 and the lower edge of the transversely curved hood 14′, should be sufficient to allow easy passage of the re-lighting pilot through the clear space, and the free movement of the parts into and out of position without any interference, one from the other.

The purpose of the invention as last described, may also be achieved by slightly flexing the pilot tube 16, to overcome its initial resistance, but this is not recommended, inasmuch as the essential accurate position in the relation of the parts may in time be disturbed, unless great care be exercised in bending the pilot tube.

Variations from the specific form shown and described may be resorted to within the scope of the appended claims without departing from the spirit of my invention.

I claim:

1. The combination with a gas burner having a feed-pipe for conducting gas from a controlling valve thereto; of an angular member comprising a substantially tubular section projecting into said pipe and an arched hood section at an angle to said tubular section, the latter having an opening above the level of said burner for directing a jet of gas beneath said hood section and against the burner, and a pilot located within said hood section for igniting said jet.

2. The combination with a gas burner having a feed pipe for conducting gas from a controlling valve thereto; of an angular deflector of two sections having one section thereof partially projecting into said pipe transversely thereof and provided with an opening substantially parallel to said pipe for directing a jet of gas externally thereof and toward said burner, the other section of said deflector forming a hood extending along said pipe in the direction of the burner, and a pilot adjacent said opening.

3. The combination with a gas burner having a feed pipe for conducting gas from a controlling valve thereto; of an angular deflector of two sections having one section thereof projecting into said pipe and provided adjacent its outer extremity with an opening for directing a jet of gas externally of said pipe toward said burner, a pilot adjacent said jet, and a hood forming the other section of said deflector and projecting from the outer extremity of the first named section in the direction of said burner and above said pilot.

4. In a gas range, a main burner and means for maintaining a jet of gas in proximity to the burner for igniting the gas flowing from the latter, combined with a pilot associated with the burner for maintaining a lighting jet in proximity to the igniting jet, the said burner and pilot being unattached to, and relatively movable in respect to, each other, whereby the burner may be readily separated and removed from association with the pilot.

5. In a gas range, a main burner and means for maintaining a jet of gas in proximity to the burner for igniting the gas flowing from the latter, combined with a pilot associated with the burner for maintaining a lighting jet in proximity to the igniting jet, the said burner and pilot being unattached to, and relatively movable in respect to, each other, whereby the burner may be readily separated and removed from association with the pilot, and means for protecting the said lighting jet from accidental extinguishment.

6. In a gas range, a main burner and a gas intake pipe leading thereto, the latter being provided with means permitting the emission of an igniting jet of gas in proximity to the burner, combined with a pilot for maintaining a lighting jet in proximity to the igniting jet, and a shield for protecting the lighting jet from extinguishment, the said intake pipe and pilot being relatively movable in respect to each other and the pilot wholly unconnected with the intake pipe, whereby the burner may be readily separated and removed from association with the pilot.

7. In a gas range, a main burner and an intake pipe having means including an outlet for the emission of an igniting jet of gas in proximity to the burner and a protecting shield disposed over the said outlet, combined with a pilot for maintaining a lighting jet in proximity to the igniting jet, the said intake pipe and pilot being relatively movable in respect to each other and the pilot wholly disconnected from the intake pipe, whereby the burner may be readily separated and removed from association with the pilot.

8. In a gas range, a burner provided with a tubular member in communication with the supply of gas therefor, the said member having means permitting the emission of a jet of gas in proximity to the burner for initially igniting the gas flowing therefrom, combined with a pilot for maintaining a jet of gas in proximity to the igniting jet for automatically re-lighting the burner upon extinguishment, the said burner and pilot being relatively movable in respect to each other and the pilot wholly disconnected from the burner, whereby the burner may be readily removed from association with the pilot.

9. In a gas range, a burner provided with a tubular member in communication with the supply of gas therefor, the said member having means permitting the emission of a jet of gas in proximity to the burner for initially igniting the gas flowing therefrom, combined with a pilot for maintaining a jet of gas in proximity to the igniting jet for automatically re-lighting the burner upon extinguishment, and means for preventing accidental extinguishment of the re-lighting jet, the said burner and pilot being relatively movable in respect to each other and the pilot wholly disconnected from the burner, whereby the burner may be readily removed from association with the pilot.

In testimony whereof, I have signed my name at Brooklyn, this 31st day of March, 1931.

DANTE RASO.